(12) United States Patent
Dannoux et al.

(10) Patent No.: US 8,776,548 B2
(45) Date of Patent: Jul. 15, 2014

(54) ULTRA THIN GLASS DRAWING AND BLOWING

(75) Inventors: Thierry Luc Alain Dannoux, Avon (FR); Claude Jacques Julien Vanotti, Ponthierry Saint Fargeau (FR)

(73) Assignee: Corning Incorporated, Corning, NY (US)

(*) Notice: Subject to any disclaimer, the term of this patent is extended or adjusted under 35 U.S.C. 154(b) by 820 days.

(21) Appl. No.: 12/524,941

(22) PCT Filed: Jan. 30, 2007

(86) PCT No.: PCT/IB2007/000865
§ 371 (c)(1),
(2), (4) Date: Dec. 8, 2009

(87) PCT Pub. No.: WO2008/093153
PCT Pub. Date: Aug. 7, 2008

(65) Prior Publication Data
US 2010/0107694 A1    May 6, 2010

(51) Int. Cl.
*C03B 9/03* (2006.01)
*C03B 11/10* (2006.01)
*C03B 9/30* (2006.01)
*C03B 9/32* (2006.01)

(52) U.S. Cl.
CPC ... *C03B 9/03* (2013.01); *C03B 9/30* (2013.01); *C03B 9/32* (2013.01); *C03B 11/10* (2013.01)
USPC ................ 65/82; 65/68; 65/102

(58) Field of Classification Search
CPC .............. C03B 9/00; C03B 9/03; C03B 9/30; C03B 9/32; C03B 11/06; C03B 11/10
USPC ................ 65/46–47, 84, 187–192, 108–110, 65/227–228, 229–236, 261–267, 375–283, 65/292–299
See application file for complete search history.

(56) References Cited

U.S. PATENT DOCUMENTS 822,678 A * 6/1906 Lubbers ............................ 65/87
1,570,695 A * 1/1926 Monro ............................ 65/353

(Continued)

FOREIGN PATENT DOCUMENTS

| FR | 2531699 | * | 8/1992 | ............... C03B 9/10 |
| JP | 2007001811 A | * | 1/2007 | |
| WO | WO 2005110741 A1 | * | 11/2005 | .............. B32B 17/06 |

OTHER PUBLICATIONS

Bruandet, FR2531699 Improvements to the blowing of large objects made of glass. Machine translation as provided by esp@cnet.com on Jan. 5, 2012.*

(Continued)

*Primary Examiner* — Jodi C Franklin
(74) *Attorney, Agent, or Firm* — Jeffrey A. Schmidt

(57) ABSTRACT

Systems, methods, apparatus and products relate to drawing and blowing of ultra thin glass substrates, such as flexible display glass sheets, for example, organic light emitting diode (OLED) displays, liquid crystal displays (LCDs), and/or other flexible substrate applications, such as lighting, and/or other technologies, such as electro-wetting (EW), electrophoretic display applications, etc. A localized heat source centripetally heats a vertical glass pre-form, while a pressurized air source blows the heated glass to expansion. An air bearing may centripetally blow air against the expanding pre-form to limit expansion and prevent contact of the pre-form with the localized heat source. Meanwhile, the pre-form is pulled vertically to draw the heated glass. The pre-form may float in a floatation mechanism to compensate for gravity when the pre-form is pulled upward. The blown and drawn pre-form may be cooled, coated with a polymer layer, and cut into a ribbon by in-line devices as it exits the air bearing. For example, a laser may helicoidally cut a polymer-coated blown and drawn pre-form into a ribbon, which may be rolled for collection.

24 Claims, 5 Drawing Sheets

(56) References Cited

U.S. PATENT DOCUMENTS

| | | | | |
|---|---|---|---|---|
| 1,881,327 A * | 10/1932 | Powell | | 65/26 |
| 2,344,892 A * | 3/1944 | Modigliani et al. | | 57/2 |
| 2,450,115 A * | 9/1948 | Byrnes | | 65/184 |
| 2,910,805 A * | 11/1959 | Muller et al. | | 65/32.5 |
| 3,399,984 A * | 9/1968 | Trutner et al. | | 65/285 |
| 3,486,875 A * | 12/1969 | Pymm | | 65/158 |
| 3,694,178 A * | 9/1972 | Hennequin | | 65/84 |
| 3,802,858 A * | 4/1974 | Minegishi | | 65/83 |
| 3,937,623 A * | 2/1976 | Kononko et al. | | 65/88 |
| 4,010,022 A * | 3/1977 | Schul | | 65/277 |
| 4,303,436 A * | 12/1981 | Rossi | | 65/67 |
| 5,135,727 A * | 8/1992 | Ibe | | 117/203 |
| 5,158,589 A * | 10/1992 | Curtis et al. | | 65/57 |
| 5,683,482 A * | 11/1997 | Fredholm | | 65/25.1 |
| 5,779,753 A * | 7/1998 | Vetter et al. | | 65/105 |
| 5,803,944 A * | 9/1998 | Domka | | 65/300 |
| 6,464,486 B1 * | 10/2002 | Barray et al. | | 425/535 |
| 6,684,664 B2 * | 2/2004 | Werdecker et al. | | 65/17.6 |
| 6,810,692 B2 * | 11/2004 | Taru et al. | | 65/435 |
| 2004/0025539 A1 * | 2/2004 | Fischer et al. | | 65/105 |
| 2006/0042323 A1 * | 3/2006 | Kornreich et al. | | 65/431 |

OTHER PUBLICATIONS

Mitani, Makoto. JP 2007001811 Method and Apparatus for Manufacturing Quartz Glass Tube machins translation as provided by http://dossier1.ipdl.inpit.go.jp/AIPN/odse_top_fwi.ipdl?N0000=7401 on Jan. 5, 2012.*

* cited by examiner

FIG. 12
1200

| 1202: ROTATE THE VERTICALLY ARRANGED GLASS PRE-FORM |

| 1204: APPLY HEAT CENTRIPETALLY TO GLASS PRE-FORM |

| 1206: BLOW AIR INTO A CAVITY TO BLOW THE HEATED GLASS |

| 1208: PASS HEATED GLASS THROUGH AIR BEARING DURING BLOWING TO LIMIT EXPANSION |

| 1210: PULL VERTICALLY ON AT LEAST ONE OF TWO ENDS OF PRE-FORM TO DRAW HEATED GLASS |

| 1212: ADVANCE TO NEXT PORTION OF PRE-FORM YET TO BE HEATED, BLOWN AND DRAWN |

| 1214: HEAT, BLOW, DRAW AND ADVANCE NEXT PORTION OF PRE-FORM |

| 1216: COOL PORTION OF PRE-FORM HAVING BEEN HEATED, BLOW, DRAWN AND ADVANCED |

| 1218: COAT PRE-FORM WITH POLYMER COATING AFTER GLASS IS COOLED |

| 1220: CUT THE COOLED GLASS |

| 1222: ROLL THE CUT GLASS |

ULTRA THIN GLASS DRAWING AND BLOWING

BACKGROUND

1. Field of Invention

The present invention relates to methods, systems, apparatus and products relating to drawing and blowing of ultra thin glass substrates, such as flexible display glass sheets for use in organic light emitting diode (OLED) displays.

2. Description of Related Art

Producing flat product glass for displays, such as OLEDS and liquid crystal displays (LCDs), involves many challenges. While LCDs typically require rigid display glass having minimal product distortion, such as arises due to internal stresses in large product glass plates, OLED technology is moving in the direction of providing flexible displays. Therefore, flexible polymer substrates are under investigation for use in OLED displays. Glass, however, is not generally a very flexible material, except possibly when the glass is ultra thin, so using glass in the creation of flexible OLED displays would require creation of glass thin enough to flex without breaking.

Organic light emitting diodes have been the subject of a considerable amount of research in recent years because of their use and potential use in a wide variety of electroluminescent devices. For instance, a single OLED can be used in a discrete light emitting device or an array of OLEDs can be used in lighting applications or flat-panel display applications (e.g., OLED displays). Some OLED displays are known as being very bright and having a good color contrast and wide viewing angle. However, the traditional OLED displays, and in particular the electrodes and organic layers located therein, are susceptible to degradation resulting from interaction with oxygen and moisture leaking into the OLED display from the ambient environment. The life of the OLED display can be increased significantly if the electrodes and organic layers within the OLED display are hermetically sealed from the ambient environment.

Another challenge, therefore, with the creation of an OLED display is the requirement that the OLED display seal out moisture and oxygen, which may destroy the OLEDs if they permeate the display. For instance, the hermetic seal should provide a barrier for oxygen ($10^{-3}$ cc/m²/day) and water ($10^{-6}$ g/m²/day). A disadvantage of polymer substrates, though, is their susceptibility to permeation of moisture and oxygen. Glass, however, is one of the few materials simultaneously offering transparency, a scalable surface, and an efficient, long term barrier to oxygen and moisture. These properties are required for current, and most of future, display panels, on at least one side of the device. As such, glass remains a prime candidate for OLED display manufacture. For instance, rigid OLED displays may use rigid sheets of glass to encase the OLED pixels, which then may be hermetically sealed using a frit seal.

The flexibility of glass can be characterized by the radius of curvature, typically ranging from 10 mm to 10 cm, for example. In contrast to flat, thin, but rigid current LCD displays, the flexible OLED displays need a flexible substrate, possibly both in a roll-to-roll manufacturing process as well as in the device itself. The glass thickness compatible with such radius at an admissible stress level is respectively in the order of 10 to 30 µm.

Producing such thin glass sheet is still a tenuous task using techniques of the prior art. Known fusion draw or down draw processes are usually limited to producing glass of thickness of 100 µm, but they are limited also in width because of side reduction while drawing. It would therefore be desirable to develop a new process for ultra thin glass manufacturing for production of flexible glass substrates.

SUMMARY OF THE INVENTION

In accordance with one or more embodiments of the present invention, systems, methods, apparatus and products relate to drawing and blowing of ultra thin glass substrates, such as flexible display glass sheets for use in organic light emitting diode (OLED) displays, liquid crystal displays (LCDs), and/or other flexible substrate applications, such as lighting, and/or other technologies, such as electro-wetting (EW), electro-phoretic display (EFD) applications, etc.

According to one or more embodiments of the present invention, a method of producing glass from a glass pre-form may include applying heat from a localized heat source centripetally to a first midsection of the glass pre-form; blowing air into an open end of the glass pre-form to expand a cavity at the first midsection and to blow the first midsection; and blowing air against an exterior surface of the glass pre-form to limit expansion of the cavity. In addition, the glass pre-form may be pulled while being blown; then cooled; then coated with a polymer laminate; and then cut helicoidally.

According to one or more embodiments of the present invention, a method of producing glass may include applying heat from a localized heat source centripetally to a first midsection of a vertically arranged glass pre-form; blowing air into an open end of the pre-form to expand a cavity at a first midsection and to blow the first midsection; pulling vertically on at least one of the two ends of pre-form to draw the first midsection; advancing to a second midsection adjacent the first midsection; and processing the second midsection as the first midsection was processed.

The method also may include rotating the glass pre-form; passing the glass pre-form vertically through an air bearing as the cavity is expanding to limit expansion of the cavity; exerting an upward force on the top end; exerting an upward force on the bottom end; cooling the glass pre-form with an in-line cooling device after the middle section has been blown and drawn; coating the glass pre-form with a polymer coating after the middle section has been blown and drawn; cutting the glass pre-form helicoidally with a laser after the middle section has been blown and drawn; and/or rolling the helicoidally cut glass.

According to one or more embodiments of the present invention, a system for processing glass may include a localized heat source operable to centripetally heat a first midsection of a vertically arranged glass pre-form; a pressurized air source operable to blow air into an open end of the pre-form to expand its cavity and to blow a middle section; a chuck operable to form an air-tight connection between the open end and the pressurized air source; an air bearing operable to centripetally blow against an exterior surface of the middle section as the cavity in the middle section is being blown to expansion; a pulling mechanism operable to vertically pull on at least one of the two ends of the pre-form to draw the middle section; and a suspension mechanism operable to attach to and suspend the top end of the pre-form.

The system also may include a floatation mechanism operable to support a bottom section of the pre-form by floatation; an in-line cooling device operable to centripetally cool the glass pre-form after the middle section has been blown and drawn; an in-line coating device operable to centripetally apply a polymer laminar coating to the glass pre-form after the middle section has been blown and drawn; and/or an in-line cutting device operable to cut the glass pre-form after the middle section has been blown and drawn.

According to one or more embodiments of the present invention, an apparatus for processing glass may include a localized heat source operable to centripetally heat a middle section of a glass pre-form in order to allow the middle section to be drawn and blown; and an air bearing operable to centripetally blow against an exterior surface of the middle section as the middle section is being drawn and blown to expansion. The apparatus also may include an in-line cooling device operable to centripetally cool the glass pre-form after the middle section has been blown and drawn.

According to one or more embodiments of the present invention, a product of the present invention may include a polymer-coated glass ribbon of ultra thin glass created from a tubular glass pre-form according the method of the present invention.

The advantages of this invention are best understood after reading the detailed technical description, and in relation to existing glass manufacturing processes. Nonetheless, some of the advantages are highlighted below.

Among other advantages, the heating and blowing apparatus is compact and yet delivers large thin sheet width, in contrast to a larger, conventional drawing process. Moreover, whereas the conventional drawing process may either dramatically reduce the sheet width or just maintain it with glass losses on each side, there is little to no width or diameter reduction under drawing according to the present invention.

Also, use of an updraw allows a floor level set up and upward glass envelope evacuation. Thanks to the pre-form floating concept, the drawing process is partially to substantially free of the effects of gravity.

There is a very high conversion ratio of the pre-form surface area to the blown cylinder surface area, in that one meter may be transformed into more than 25 meters, and 0.2 square meters (1 m×2πr, r=30 mm) may be transformed into about 25 square meters (25 m×2πr, r=15 cm) (a ratio of 1:125). There is similarly a very high thickness transformation ratio, where 1500 μm becomes 30 μm for a ratio of 50:1.

In addition, the process can produce flat or non-flat thin glass sheets. A flat sheet would be flat in two dimensions, whereas a non-flat sheet may be flat in one dimension and curved in the second dimension. The third dimension, the thickness, would be uniformly thin. The non-flat glass sheets likely may be suitable, for example, to be rolled lengthwise under a small radius (for use, for instance, in a rolled display).

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to scale, and the aspects of the drawings may not be to scale relative to each other. To avoid cluttering the drawings, not all drawings contain all potential reference numerals.

FIG. 12 is a flow diagram illustrating process actions of a process of producing glass that may be carried out in accordance with one or more embodiments of the present invention.

DETAILED DESCRIPTION OF THE PRESENT INVENTION

Figure 1:
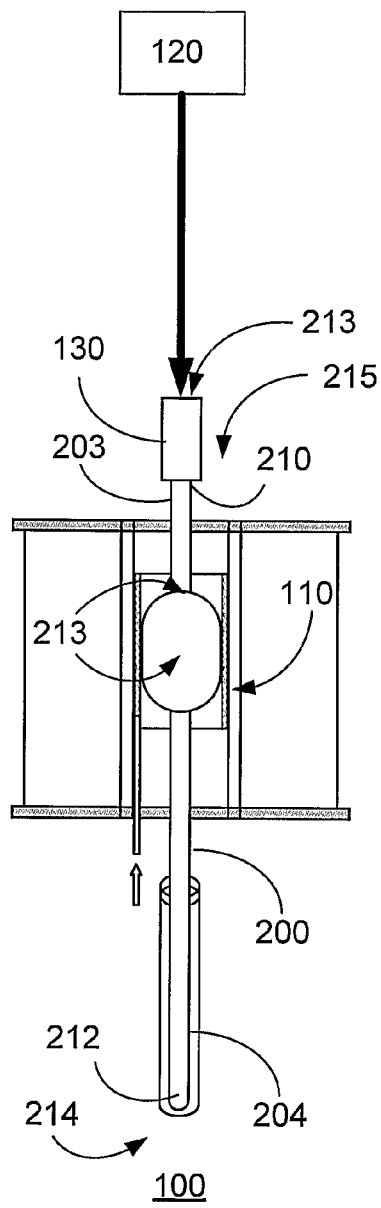
FIGS. 1-5 are drawings illustrating an exemplary blowing and drawing system in accordance with one or more embodiments of the present invention, at various stages of blowing and drawing a pre-form.
Figure 2:
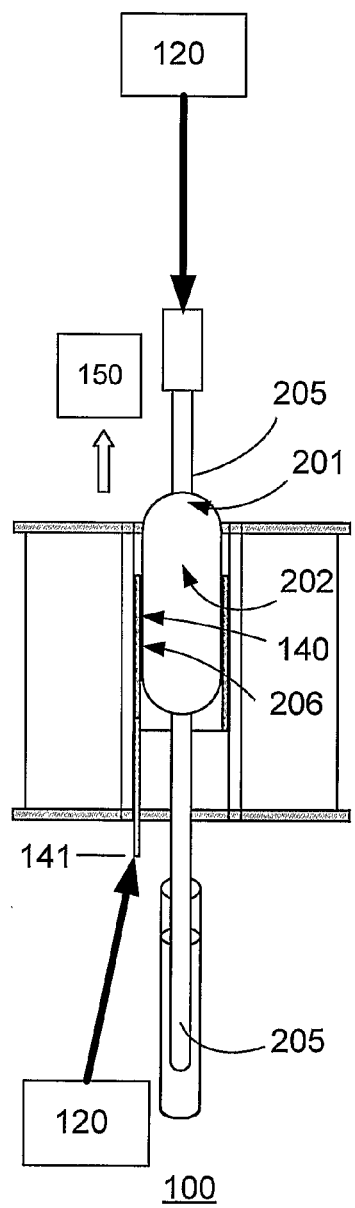
Figure 3:
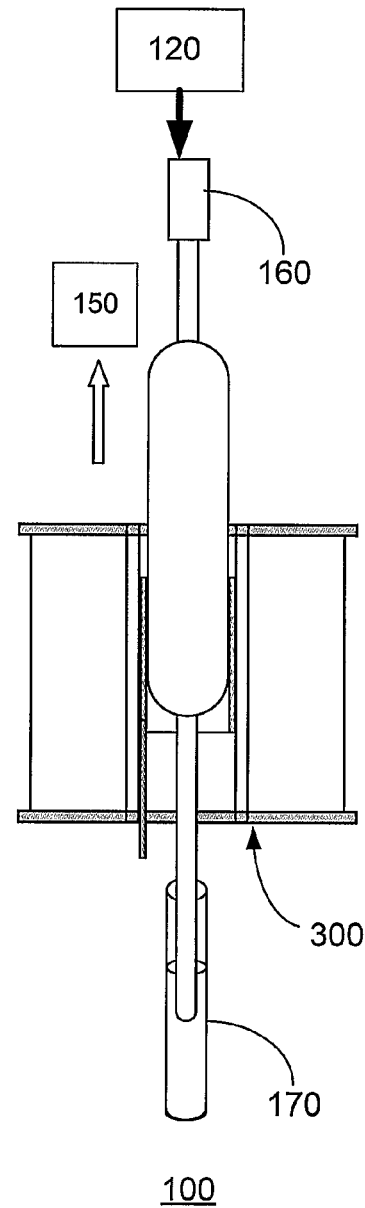
Figure 4:
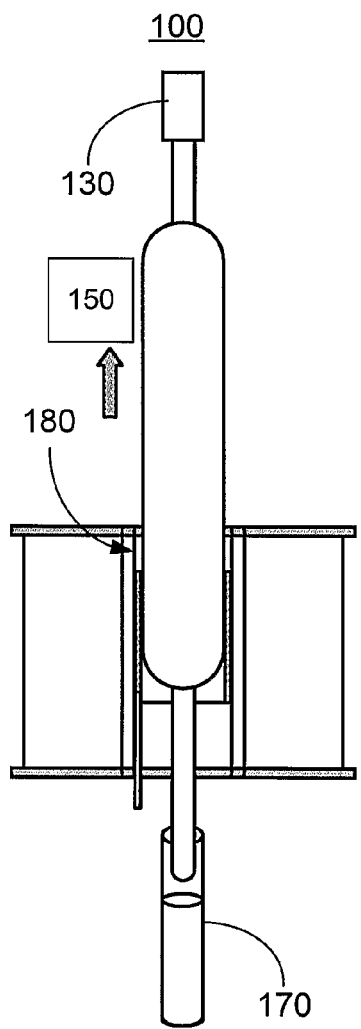
Figure 5:
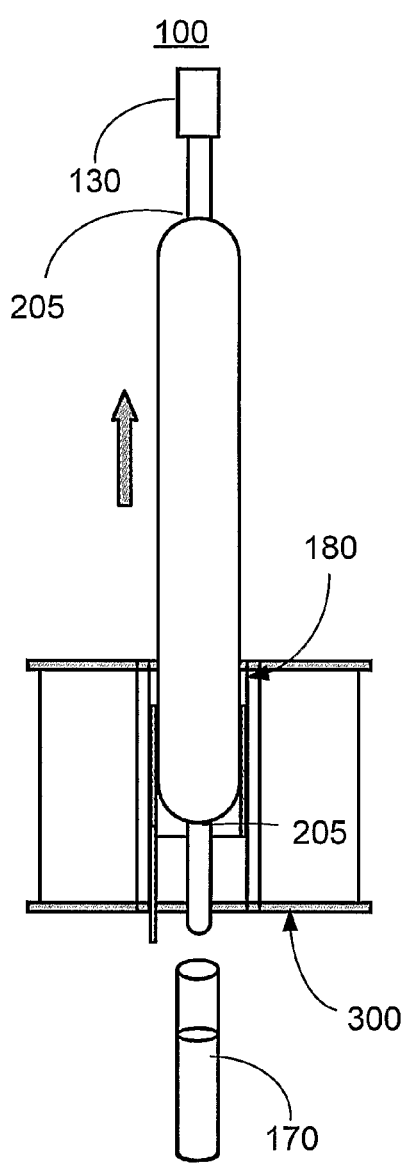

The present invention relates to methods, systems, apparatus and products related to drawing and blowing of ultra thin glass substrates. In particular, the present invention relates to a process for manufacturing ultra thin glass, for example, for use in flexible display applications.

Given that displays historically have been rigid, glass substrates commonly have been made using a process known as the fusion process (e.g., downdraw process) to form high quality thin glass sheets that can be used in a variety of devices like flat panel displays. The fusion process is the preferred technique for producing glass sheets used in flat panel displays because the glass sheets produced by this process have surfaces with superior flatness and smoothness when compared to glass sheets produced by other methods. The general fusion process is described in numerous publications, such as U.S. Pat. Nos. 3,338,696 and 3,682,609, and is well-known in the art.

By way of example, the product glass may comprise CORNING INCORPORATED GLASS COMPOSITION NO. 1737 or CORNING INCORPORATED GLASS COMPOSITION NO. EAGLE$^{2000}$™. These glass materials have numerous uses, in particular, for example, the production of OLED and liquid crystal displays, as well as other applications.

One embodiment of the fusion process involves using a fusion draw machine (FDM) to form a continuous glass ribbon and then draw the glass ribbon between two rolls to stretch the glass to a desired thickness. A traveling anvil machine (TAM) is used to cut the glass ribbon into smaller glass sheets that are sent to customers. These glass sheets may be as thin as 100 μm, but even this thickness causes the glass sheet to be inflexible and brittle. To avoid these limitations, the present invention moves away from the fusion process towards a combination of a blowing and drawing of tubular glass pre-forms.

In a usual down draw process, sheet width and thickness are both reduced. This result is extremely limiting when desiring to obtain large width sheets. Changes to the fusion draw process may address this point in part with the employment of edge rollers to maintain total width, but this change creates non-usable areas and thick beads on both sides.

Instead of down drawing the glass, the present invention combines lateral blowing, to increase the width and decrease the thickness, and longitudinal drawing, also to decrease the thickness. The process begins with a glass pre-form, which is a mass of glass having an initial shape, such as a tube, suitable for the intended manipulation, and the pre-form acts as a limited reservoir of glass from which to draw and blow the product glass. This combination of lateral blowing and longitudinal drawing avoids the pre-form diameter reduction of down drawing and increases the pre-form diameter without any other side actions.

Tubular pre-forms may include, for example, aluminosilicate tubes of CORNING INCORPORATED GLASS COMPOSITION NO. 1724, having a softening point at 926° C. In order to produce about 1 m large sheets, an embodiment may target a final glass tube diameter of 30 cm, after processing. Pre-forms suggested for this target may have, for example, a 60-mm diameter and 2-mm web thickness.

The tubular pre-form may be closed hermetically at its bottom extremity, like a test tube, while its upper extremity is held in an air tight rotating chuck. This chuck may include a rotating joint through which internal pressure used is supplied for blowing the glass. The tube is placed in a heating zone (e.g., infra red, gas burner, induction or other local heating means) and contained by a heated cylindrical air bearing that helps to obtain the required precise final diameter. Depending on the particular parameters and characteristics of the glass, such as the viscosity of the glass, the glass may be maintained at about 920° C. in the heating zone, and at 890° C. at the air bearing level.

The pre-form may be rotated slowly (1-4 rpm) for homogeneous heating and substantially perfect cylindricity, while traversing and exiting the air bearing. A bottom suspension system may allow this rotation with a minimum of friction and may suppress in part the effects of gravity.

Under a light internal blowing pressure, typically 0.3 bars, the diameter of the pre-form progressively may expand to the air bearing surface, without touching it. The glass then may be forced to expand downward as the glass remains contained in the cylinder. The upper rotating chuck may be raised slowly at a speed V corresponding substantially to the bulb growth speed. The bottom part of the pre-form progressively may rise also, but at a much slower speed, which corresponds to the amount of glass displaced in the formation of the larger diameter.

The speed ratio may be inversely proportional to the ratio of the final and initial tube sections as follows:

Initial section $s=\pi(r_2^2-r_1^2)$

Final section $S=\pi(R_2^2-R_1^2)$ $V/v=\pi(r_2^2-r_1^2)/\pi(R_2^2-R_1^2)=(r_2^2-r_1^2)/(R_2^2-R_1^2)$ where $r_2$ and $r_1$, respectively, are the outer and inner diameters of the pre-form, and $R_2$ and $R_1$, respectively, are the outer and inner diameters of the final tube.

A pre-form floating system avoids the uncontrolled effects of gravity, which otherwise rapidly disturb the drawing in a conventional drawing process. The floatation principle partially neutralizes the effect of gravity. The floatation mechanism also may compensate for adjustments in the gravitational force as the pre-form is consumed and the remaining hanging bottom part of the pre-form progressively diminishes.

During the drawing and blowing actions, the level of the liquid in which the bottom part of the pre-form is floating adjusts as the pre-form rises and displaces less of the liquid. If desired, the process may compensate for the reduced displacement in that the liquid level may be adjusted upward, either by raising the liquid container, or by adding more liquid, in order to follow the rise of the pre-form, but at a little bit lower speed than v, in order to still support the weight of the pre-form, whose effective weight progressively decreases as the pre-form is consumed.

The blown envelope is rotating in the air bearing, without touching it. Again, depending on the particular parameters and characteristics of the glass, at 890° C., the air gap may be in the range of 100-120 μm, and may be maintained by a 3 bars of air pressure inside the air bearing chamber. The envelope tends to expand at its lower extremity due to the fact that the bottom extremity is at the higher temperature. The upper extremity and body of the blown envelope quickly cool and "freeze" in the upper part of the air bearing as they are drawn upward.

Once a desired amount of the pre-form has been transformed into the blown envelope, the result is a long and extremely thin tubular bulb, closed at the upper and lower extremities. Several successive pre-forms may be blown and transformed into long, extremely thin tubes. The ultra thin glass may be protected by in-line polymer coating deposition for its reinforcement. A polymer coating such as a polyimide or an acrilamide layer may be deposited on the exterior surface under formation at, for example, a temperature less than 100° C. This 10- to 150-μm thick protective layer consolidates the glass envelope prior its post-blowing processing including cutting. The polymer layer alternatively may be deposited in a separate phase, on the inside or outside surface of the glass envelope.

The cutting may involve a simple envelope opening, along a generative line, or a helicoidal cutting offering a semi-continuous glass ribbon, for roll-to-roll processing, for example. The width of this ribbon is dependent in part on the pitch of the helicoids. In this approach, a targeted display height can be directly cut, without post-cutting finishing along this direction. It is interesting to note than a single cut creates both sheet edges. Cutting is advantageously performed by an IR laser, quadrupled YAG laser at 266 nm wavelength, etc. By changing the cutting pitch and the receiving roller angle β, the width of the ribbon is adapted to display or other product size.

In some embodiments, a polymer laminar coating may be applied. After the blowing, the long cylindrical bulb may pass through a coating ring depositing a 10 to 150 μm thick polymer coating, such as optical fiber coating, in one or several steps. This polymer then is cured, for instance, either thermally or by UV light. The polymer protective layer helps protect the glass bulb during handling prior cutting.

In PCT Patent Application Publication No. WO 2005/110741 A1, titled "Process For Composite Layered Material For Electrical Devices" ("PCT '741"), a process is disclosed for production of ultra thin glass having a thickness as low as 5 μm. A polymer coating is applied to the glass in a thickness about 50 μm. Assorted polymer compositions were disclosed and tested. Various tests were performed on the composite layered material comprising the thin glass and polymer coating to investigate its suitability for use in OLED displays, LCDs, lighting, EW, EFD applications, etc. The tests related to mechanical flexibility, oxygen permeability, moisture permeability, puncture resistance, and polymer-to-glass adhesion. The localized mechanical stability of the glass also was noted during cutting of the polymer-coated glass with scissors and puncture resistance testing, showing that localized glass fragmentation occurred at the cut edge more often in sheets with thicker glass.

Beginning on page 20 of PCT '741, the production of the thin glass is disclosed. In contrast to the present invention, which begins with a narrow, thick tubular glass pre-form, PCT '741 used a glass cylinder having an initial thickness of 2.5 mm, an initial length of 370 mm, and an initial diameter of 100 mm. The two open ends of the cylinder were blocked off to create a closed system into which compressed air was pumped during the stretching process to maintain a constant internal air pressure.

In contrast to the present invention, the glass cylinder, also referred to as a "native glass tube," of PCT '741 simply is a thicker version of the thin, "virgin tube" that is an extension of the glass cylinder formed by stretching the glass cylinder. The native tube and the virgin tube "together form one integral tube." An embodiment of the present invention, though, uses air pressure, both inside and outside the glass pre-form, to blow the pre-form to a substantially wider, specific diameter.

The examples of PCT '741 involved horizontally rotating the native tube cylinder over a flame until the glass reached a transition temperature of about 1300 Celsius, at which point the flame was shut off and native tube was drawn, i.e., stretched, horizontally (axially to the cylinder). While being stretched, compressed air was pumped into the integral tube to keep it from collapsing and forming a bottle neck. The compressed air that is pumped into the integral tube during the stretching step was intended to maintain the initial diameter of native tube during the creation of the virgin tube. Specifically, PCT '741 states, "The gas flow-time profile was be [sic] regulated in such a manner that upon stretching the glass cylinder the diameter of the stretched part of the glass remained constant over the length of the stretched glass part."

Although PCT '741 also states, "In other experiments [the gas flow-time profile] was chosen in such a manner that the diameter of the molten glass was increased with respect to the original diameter and remain[ed] constant over the length of the stretched glass part," no details of such experiments were provided, and no indication was given that the increase was anything more than a marginal increase over the initial diameter, probably as a result of an accidental miscalculation in gas flow regulation. In particular, there is no teaching to take a narrow, thick tubular pre-form and draw and blow it into a much wider, much longer, and much thinner glass cylinder, as in embodiments of the present invention.

Moreover, PCT '741 makes no mention of using any components in addition to the internal air pressure to regulate the expansion of cylinder diameter. In contrast, the embodiments of the present invention use the air bearing to exert air pressure on the exterior surface of the blown cylinder to keep the blown cylinder diameter from increasing too much, to keep the blown cylinder from contacting other components of the system as the cylinder is being blown, and to keep the internal air pressure relatively stable over the interior surface area of the blown cylinder.

A result of the present invention is that the pre-form is blown up into a blown cylinder in a manner not unlike that used to blow up a long narrow balloon, where the additional air pressure causes the balloon to expand at an expansion point that is opposite to the source of compressed air. Unlike the present invention, PCT '741 uses air pressure not to blow the glass, but to prevent a negative pressure difference (partial vacuum) from forming as the interior volume of the closed space increases. PCT '741 uses the compressed air to equalize the air pressure exerted on the inside of the virgin tube with the air pressure exerted on the outside of the virgin tube, due to the fact that the virgin tube would collapse, if still soft, or break, if already hard, under the higher outside air pressure.

Furthermore, using the pre-form floating system, embodiments of the present invention allow for compensation of the effects of gravity to enable a partially gravity-free upward drawing process, whereas PCT '741 does not. At best, PCT '741 might be characterized as equally distributing the effects of gravity, rather than compensating for them, by rotating the native tube at higher rates, such as 38 RPM, to prevent the virgin tube from sagging. Through the use of the upward draw, the present invention also may be characterized as equally distributing the remaining, uncompensated effects of gravity by drawing in a direction opposite gravity. By orienting the axis of the blown cylinder, and thus its side wall, parallel to gravity, gravity works equally on the cylinder side wall to pull against the draw direction.

On page 7, PCT '741 mentions that "a virgin contact-free glass film with a cylindrical shape" might be produced using a "Matsunami style mechanical blowing process," a modified version of the "mechanical cylinder bolowing process of Lubbers style" of 1902. However, as PCT '741 points out, Matsunami apparently has not published any details, such as on his website www.matsunami-glass.co.jp, of how he was able to "make a plate by securing the cylindrical form and blowing air into thin film glass at the same time" to create glass of thickness 1.5-50 µm. Even though the Lubbers style involved upward drawing, as disclosed in U.S. Pat. No. 822,678, to Lubbers ("Lubbers' '678 patent"), neither Lubbers' '678 patent, Matsunami, nor PCT '741 suggests updrawing from a tubular glass pre-form.

Lubbers' '678 patent discloses a method of drawing glass cylinders directly from a bath of molten glass. According to Lubbers' '678 patent, a glass cylinder is created as molten glass, a portion of which has attached itself to the end of a blowpipe, is drawn upward and initially blown outward by being inflated with air exiting the blowpipe. To lengthen the cylinder, the wide bottom of the Lubbers cylinder draws up more, similarly-wide, cylindrical molten glass from the bath, while the air from the blowpipe supports the molten glass in the similarly-wide cylindrical shape. Relative to the intended width and size of the product cylinder, the bath provides a relatively unlimited volume and diameter of molten glass during the updraw of the cylinder.

Insofar as the bath of molten glass in Lubbers provides as much new similarly-wide cylindrical molten glass as the updrawn cylinder may hold, given the updraw speed and the air from the blowpipe, the air pressure from the blowpipe only initially thins an existing thickness of glass by blowing it wider at the bottle neck at the top of the cylinder. Otherwise, Lubbers' '678 uses air pressure to maintain a similarly-wide cylinder diameter as the cylinder is drawn directly from the bath. In contrast, embodiments of the present invention involve continuously taking from the pre-form a limited portion of molten glass of a narrow diameter and continuously thinning the limited portion by substantially increasing its diameter. Even if Matsunami were able to modify the process of the Lubbers' '678 patent to create ultra thin glass, such a Matsunami-modified Lubbers' process still would be substantially different from the present invention for similar reasons.

The Lubbers and Matsunami references are distinguished as well in PCT '741. A detailed analysis of PCT '741 is useful, however, not only for identification of these and the other differences between the present invention and the PCT '741 disclosure, but also for the experimental data that confirm the properties of ultra thin glass, such as oxygen and moisture impermeability and higher flexibility. PCT '741 additionally provides a useful discussion of various polymer coating compositions, an overview of OLED display development efforts and requirements, and an interpretation of the prior art of thin glass production.

Referring to FIGS. 1-5, the drawings illustrate an exemplary blowing and drawing system 100 in accordance with one or more embodiments of the present invention, at various stages of blowing and drawing a pre-form 200. The glass pre-form 200 is depicted as cylindrically tubular; however, other geometries might work, depending on the circumstances. The final blown and drawn geometry depends in part on the blowing and drawing actions, but these actions tend to maintain any inconsistencies or non-uniformities of the initial geometry of pre-form 200, so a pre-form 200 having more uniform and circular dimensions will result in a blown and drawn bulb having more uniform and circular dimensions. The better the pre-form 200, the better the blown and drawn bulb.

The glass pre-form 200 may include a first midsection 201 and a second midsection 202. The pre-form 200 may be arranged vertically and have two ends, including an open end 210 and a closed end 212. The open end 210 opens into a cavity 213 extending into the pre-form 200 at least to the first midsection 201. The two ends further include a bottom end 214 and a top end 215. The glass pre-form 200 further may be considered as having a top end section 203, a bottom end section 204, and a middle section 205 between the top end section 203 and the bottom end section 204. The middle section 205 includes the first midsection 201 and the second midsection 202.

In contrast to pre-forms in the prior art, the present invention takes a pre-form 200 of a relatively narrow diameter and creates a bulb of a much larger diameter. In the prior art, a pre-form rod typically is stretched to create an optical fiber, going from a relatively wide diameter rod to a very narrow diameter fiber. Pre-form rods of the prior art used in creating optic fibers also do not have cavities, whereas the pre-forms 200 used in the present invention have cavities into which air is pumped.

Blowing and drawing system 100 may include a localized heat source 110 to centripetally heat the first midsection 201 of the vertically arranged glass pre-form 200. The heat source 110 is localized insofar as the heat source 110 applies heat to only a localized section of the pre-form 200, e.g., the first midsection 201, and not the entire pre-form 200. Embodiments of the present invention may heat only a small portion of the pre-form 200 at a time, e.g., the first midsection 201, and this small portion may be blown and drawn while hot and then may be allowed to cool.

System 100 also may include a pressurized air (or an inert gas) source 120 to blow air into the open end 210 to expand the cavity 213 and to blow the middle section 205. To form a relatively air-tight connection between the open end 210 and the pressurized air source 120, system 100 may include a chuck 130, which also may rotate the pre-form 200 during drawing and blowing. A relatively air-tight connection comprises a connection that channels enough of the pressurized air from the pressurized air source 120 into the cavity 213 so as to blow the cavity 213 in the desired manner. However, a substantially air-tight connection may be more desirable than a relatively air-tight connection.

System 100 further may include an air bearing 140 to centripetally blow against an exterior surface 206 of the middle section 205 as the cavity 213 in the middle section 205 is being blown to expansion. Air from the pressurized air source 120 may enter the air bearing 140 at air intake 141. Air intake 141 may be on the bottom, as shown, or the top or side, depending on the desired arrangement. The air may be heated so as not to prematurely cool the pre-form 200 during blowing. The localized heat source 110, the air bearing 140, and the air intake 141 may be embodied in an in-line unit 300. While reference is made to air in general, any gas composition may be used, if desired, that takes the processing parameters into consideration, such as the heat and glass composition. For example, nitrogen may be used.

The air bearing 140 may be made, for instance, of porous graphite. Within the in-line unit 300, the air bearing 140 may form an annular cavity between a graphite cylinder and the localized heat source 110. The localized heat source 110 may be made, for example, of mullite, which is not porous, and the air bearing 140 may be porous graphite. Pressurized air enters the annular cavity, equalizes the pressure in the cavity and is then forced through the fine pores of the graphite cylinder toward the blown pre-form 200. Although other materials, such as low-CTE fine-porosity ceramics, may be used instead of graphite, graphite is advantageous because of its wide range of coefficients of thermal expansion (CTE), its ability to withstand very high temperatures, such as up to 2800 Celsius, and its tendency to heat up evenly. A graphite composition may be selected, for instance, having a CTE matching that of the heat source 110, e.g., mullite. Graphite also advantageously may be made to have very fine pores, providing for an even application of pressure against the pre-form 200 as it is being blown and drawn. If the pores are too large, the air pressure applied to the exterior 206 may be too concentrated and may discolor or crush the exterior 206.

System 100 also includes a pulling mechanism 150 operable to vertically pull on at least one of the two ends 210, 212 to draw the middle section 205. Pulling mechanism 150 can be embodied in any of many ways, such as a rail system, a pulley system, a cog system, etc. in order to pull on the chuck 130. In one or more embodiments, an operator may control the direction, force and speed of the pull exerted by the pulling mechanism 150. Depending on the configuration, the vertical pull may be downward or upward. The pulling mechanism 150 is shown as pulling vertically upward on the chuck 130. A vertical upward pull with the open end 210 at the top end 215, with the closed end 212 at the bottom end 214, allows the heat source 110 and air bearing to be stationary. With the upward pull, the bottom end 214 rises at a lower rate than the top end 215, automatically advancing the pre-form 200, with the difference in rate due to additional length added as the middle section 205 passes through the heat source 110 and is drawn to expansion.

Variations in achieving the relative movement of the upper, middle and lower sections of the pre-form 200 are also contemplated. For example, the localized heat source 110 may be lowered toward the bottom end 214 of the pre-form 200 at a rate that is slower than a rate of pulling the top end 215 upward. This technique may be accompanied by keeping the bottom end 214 substantially stationary (vertically). Alternatively, the bottom end 214 may be pulled downward, while exerting an upward force on the top end 215, e.g., while keeping the top end 215 substantially stationary (vertically). This may be accompanied by lowering the localized heat source 110 toward the bottom end 214 as described above. In a further alternative mode, the localized heat source 110 may be raised toward the top end 215 at a rate slower than the rate of pulling the bottom end 214 downward. In alternative embodiments, the top end may be lowered while pulling the bottom end 214 downward so long as the rate of such lowering is slower than the pulling rate. This may be performed while maintaining the localized heat source 110 in a substantially stationary, vertical orientation. In a still further embodiment, the localized heat source 110 may be lowered toward the bottom end 214 at a rate faster than a pulling rate of the top end 215, while keeping the bottom end 214 substantially stationary (vertically).

Irrespective of whether the pull mechanism 150 pulls vertically upward or downward, the system 100 may include a suspension mechanism operable to attach to and suspend the top end 215, attached for instance via chuck 130. Depending on the configuration, the pulling mechanism 150 and the suspension mechanism may operate in tandem. Suspension mechanism may suspend pre-form 200 such as when no upward pulling is occurring. If the pulling mechanism 150 pulls downward, the suspension mechanism may provide resistance to the downward pull, allowing the middle section 205 to be drawn to expansion.

Where the pulling mechanism 150 pulls upward, gravity counteracts in part the force pulling the top end 215 upward. For instance, the weight of the middle section 205 yet to be blown and drawn pulls down at heated first midsection 201 to further draw the first midsection 201. While some resistance to the pulling force is necessary to draw the heated glass, the amount of resistance at and below the heated glass in the first midsection 201 depends on the length of the middle section 205 yet to be blown and drawn. This situation creates a variable, albeit predictable level of resistance, which may not be desirable.

To minimize the variability and otherwise neutralize some of the effects of gravity, the system 100 may include a floatation mechanism 170 operable to support the bottom section 204 by floatation. The floatation mechanism 170 compensates for the change in length of the middle section 205 to be blown and drawn insofar as the bottom end section 204 displaces less liquid as more of pre-form 200 is blown and drawn upward. Depending on the calibration of the pulling mechanism 150, the floatation mechanism 170 may be stationary, as depicted, or it may be raised as the bottom end 214 rises as the middle section 205 is blown and drawn upward. The floatation mechanism 170 advantageously minimizes the risk that the blown and drawn pre-form 200 may break under the weight of the pre-form 200 below the midsection 201, 202 already blown and drawn. Once the first midsection 201 is blown and drawn, the thin glass walls of the bulb cannot support much weight. Using the floatation mechanism 170 and an upward draw, a much longer bulb having a more uniform glass thickness may be achieved.

Moreover, system 100 may include an in-line cooling device 180 operable to centripetally cool the glass pre-form 200 after the first midsection 201 has been blown and drawn. The in-line cooling device 180 may be a part of in-line unit 300. In-line cooling device 180 may include, for example, coils of cooling elements thermally insulated from the localized heat source 110. In practice, for instance, after the first midsection 201 has been blown and drawn upward, the first midsection 201 draws the second midsection 202 into a zone being heated by the localized heat source 110, where the second midsection 202 may be heated, blown and drawn. Meanwhile, as the first midsection 201 begins exiting the in-line unit 300, the first midsection 201 passes by the in-line cooling device 180 where the glass hardens.

Figure 6:
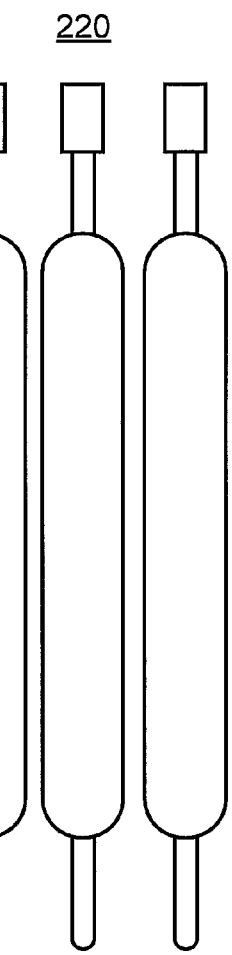
FIG. 6 is a set of drawings illustrating three exemplary expanded pre-forms in accordance with one or more embodiments of the present invention.

Referring to FIG. 6, the drawings illustrate three exemplary expanded pre-forms 220 in accordance with one or more embodiments of the present invention. After exiting the in-line unit 300, a pre-form 200 may be ready for further processing insofar as the middle section 205 completely has been blown and drawn to expansion. A pre-form 200 with a completely blown and drawn middle section 205 may be referred to as an expanded pre-form 220.

Figure 8:
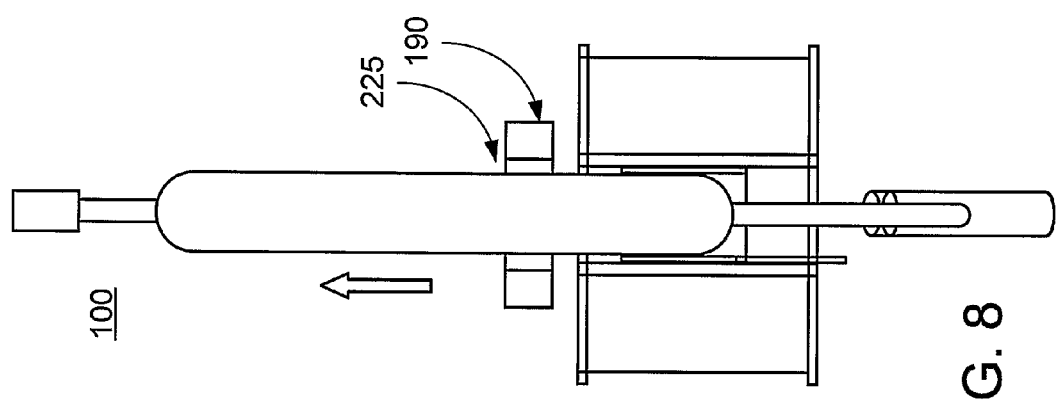
FIGS. 7-8 are drawings illustrating an exemplary blowing and drawing system in accordance with one or more additional embodiments of the present invention.
Figure 7:
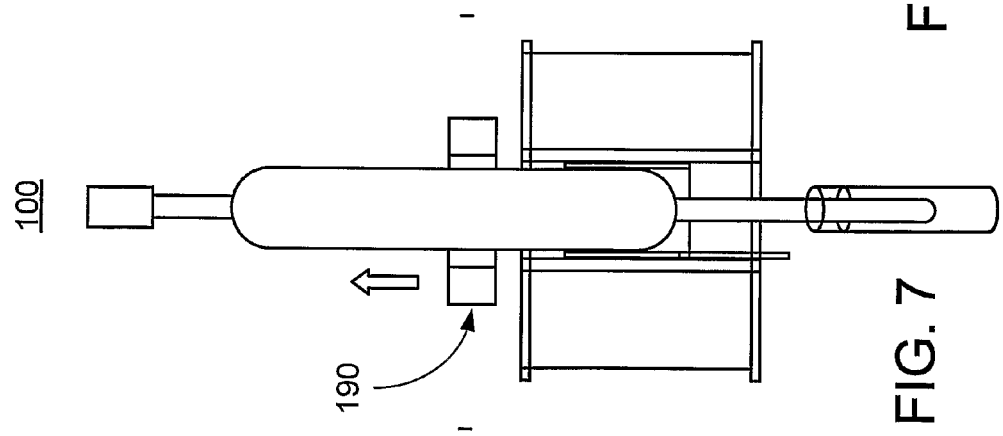

Referring to FIGS. 7-8, the drawings illustrate an exemplary blowing and drawing system 100 in accordance with one or more additional embodiments of the present invention. As the pre-form 200 is being blown and drawn to create expanded pre-form 220, an in-line coating device 190 may centripetally apply a polymer laminar coating 225 to the glass pre-form 200. System 100 may include the in-line coating device 190, and the in-line coating device may be a part of the in-line unit 300. Alternatively, the coating procedure may be preformed separately to the expanded pre-forms 220. Numerous examples of appropriate polymer compositions are known in the art, such as a polyimide or an acrilamide, and others disclosed in PCT '741.

Figure 9:
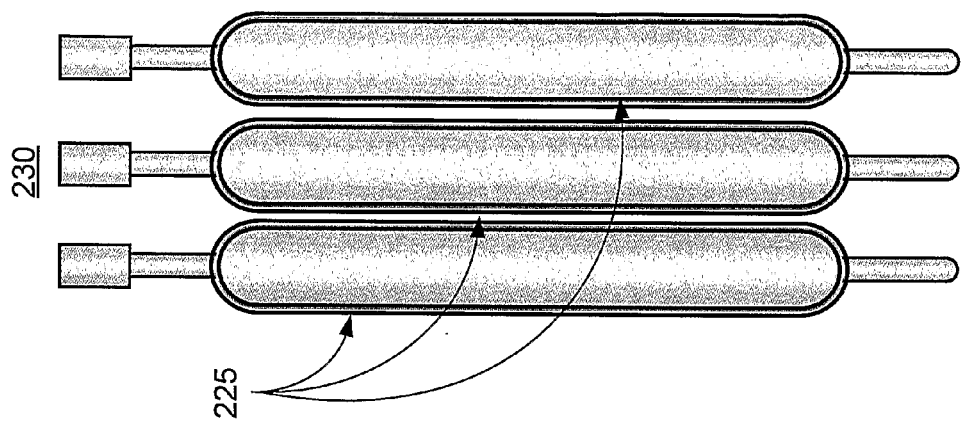
FIG. 9 is drawing illustrating three exemplary coated expanded pre-forms in accordance with one or more embodiments of the present invention.

Referring to FIG. 9, the drawings illustrate three exemplary coated expanded pre-forms 230 in accordance with one or more embodiments of the present invention. A pre-form 200 may be coated by in-line coating device 190 either as the pre-form 200 exits the in-line unit 300 or separately after pre-form 200 has been expanded completely to create expanded pre-form 220. A pre-form 200 with a completely blown and drawn middle section 205 that has been coated may be referred to as a coated expanded pre-form 230.

Figures 10, 11:
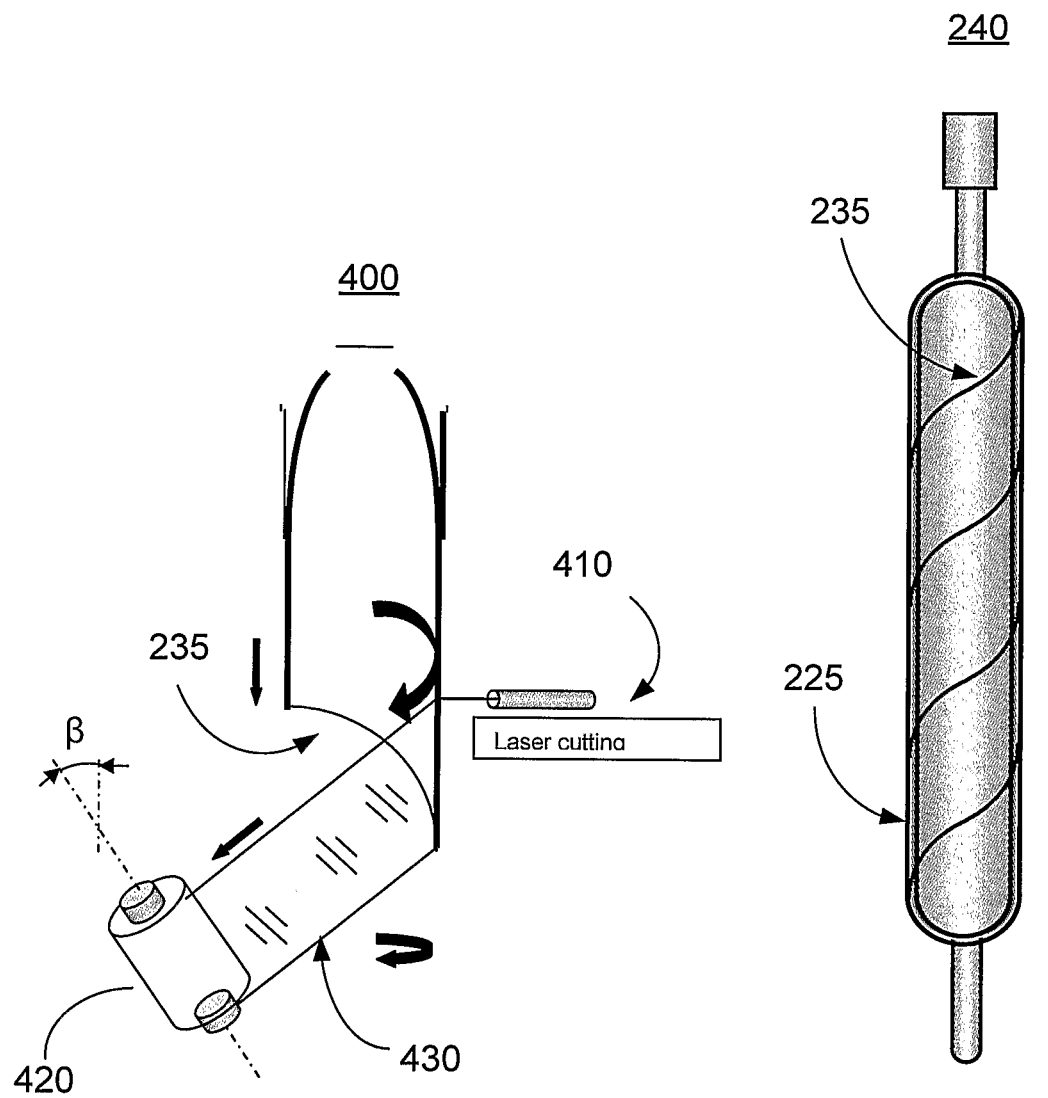
FIG. 10 is a drawing illustrating an exemplary in-line cutting device in accordance with one or more embodiments of the present invention.
FIG. 11 is a drawing illustrating an exemplary cut coated expanded pre-form in accordance with one or more embodiments of the present invention.

Referring to FIG. 10, the drawing illustrates an exemplary in-line cutting device 410 in accordance with one or more embodiments of the present invention. System 100 also may include an in-line cutting device 410 operable to cut the glass pre-form 220 or 230 after the middle section 205 has been blown and drawn. The in-line cutting device 410 may be part of a cutting and processing system 400 that also includes a rolling device 420 onto which the cut glass 430 is rolled. As shown in FIG. 10, the in-line cutting device 410 may include a laser operable to helicoidally cut the middle section 205 into a ribbon of cut glass 430. Other known devices may be used in place of the laser, but mechanical cutting devices, such as scissors, one or more cutting blade(s), or the like may increase the risk of structural damage to the cut glass 430 at the cut edge.

Referring to FIG. 11, the drawing illustrates an exemplary cut, coated, and expanded pre-form 240 in accordance with one or more embodiments of the present invention. An expanded pre-form 220 or a coated expanded pre-form 230 may be cut by in-line cutting device 410. If an expanded pre-form 220 is cut before being coated, however, the risk of damage to the cut glass 430 increases dramatically due to the unprotected and frail nature of the cut glass. Coating the glass before cutting it protects the glass and facilitates processing. However, cut glass 430 alternatively may be coated after being cut. A coated expanded pre-form 230 with a completely blown and drawn middle section 205 having a helicoidal cut 235, as shown in FIG. 11, may be referred to as a cut coated expanded pre-form 240.

Referring to FIG. 12, a flow diagram illustrates process actions that may be carried out in accordance with one or more embodiments of the present invention. An exemplary process 1200 of producing glass may include some or all of the enumerated actions.

The following actions, some of which may occur simultaneously, outline process 1200: In action 1202, the glass pre-form 200 is rotated slowly but continuously, such as by using a rotating chuck 130. In action 1204, heat from a localized heat source 110 is applied centripetally to a first midsection 201 of a vertically arranged glass pre-form 200. In action 1206 of process 1200, air is blown into the open end 210 of the glass pre-form 200 to expand the cavity 213 at the first midsection 201 and to blow the first midsection 201. In action 1208, the glass pre-form 200 is passed vertically through an air bearing 140 as the cavity 213 is expanding. In action 1210, at least one of the two ends 210, 212 is pulled vertically, either upward or downward, to draw the first midsection 201.

In action 1212, an advancement is made to a second midsection 202 adjacent the first midsection 201. In action 1214, the second midsection 202 is processed as the first midsection 201 was processed, by heating, blowing and drawing the second midsection 202, and advancing past the second midsection 202 further into the middle section 205.

In action 1216, the first midsection 201 is cooled, and later, the second midsection 202 is cooled.

In action 1218, the glass pre-form 200, 220 is coated with a polymer coating 225 after at least the first midsection 201 has been blown, drawn and cooled.

In action 1220, the glass pre-form 220, 230 is cut with an in-line cutting device 410, making for instance a helicoidal cut 235, after the middle section 205 has been blown and drawn. In action 1222, the cut glass 430 of glass pre-form 220, 230 is rolled with a rolling device 420 after the middle section 205 has been blown, drawn, cut and possibly coated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
obtaining a tubular glass pre-form having a tubular pre-form wall with an open end, a closed end, and a middle section between the open end and the closed end, all aligned in a longitudinal direction, the middle section of the glass pre-form including at least a first midsection and a second midsection adjacent to the first midsection, the open end of the glass pre-form opening into a cavity extending into the pre-form at least through the second midsection to the first midsection;
heating the first midsection of the glass pre-form by centripetally applying heat from a localized heat source to the first midsection of the glass pre-form;
blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;
blowing a gas against an exterior surface of the glass pre-form to limit expansion of the first midsection to a desire width;
longitudinally drawing the heated first midsection in the longitudinal direction of the glass pre-form, thereby thinning the pre-form wall in the first midsection;
advancing the pre-form in the longitudinal direction relative to the localized heat source such that: (i) at least a portion of the first midsection of the perform is advanced longitudinally away from the localized heat source and the heat therefrom is no longer centripetally applied to such portion, and (ii) the second midsection of the perform is advanced longitudinally toward and into proximity with the localized heat source and the heat from the localized heat source is centripetally applied to the second midsection of the glass pre-form; and
repeating the heating, blowing, and drawing steps on the second midsection.

2. The method of claim 1, further comprising rotating the glass pre-form.

3. The method of claim 1, wherein the drawing step further comprises pulling on at least one of the open end and the closed end of the glass pre-form to draw the first midsection.

4. The method of claim 3, further comprising coating at least one of an inside surface and outside surface of the blown and drawn midsection of the glass pre-form with a polymer coating.

5. The method of claim 3, further comprising at least one of:
helicoidally cutting the blown and drawn midsection of the glass pre-form into a glass ribbon; and
rolling the glass ribbon.

6. The method of claim 3, further comprising cooling the blown and drawn midsections of the glass pre-form after the first midsection has been blown and drawn.

7. The method of claim 1, wherein the glass pre-form wall has a thickness of about 2 mm.

8. The method of claim 1, further comprising advancing the blown and drawn glass pre-form vertically through an air bearing as the cavity is expanding such that the air bearing centripetally blows against an exterior surface of the glass pre-form to limit expansion of the cavity.

9. The method of claim 1, wherein the drawing step further comprises exerting an upward force on a top end of the glass pre-form arranged vertically.

10. The method of claim 1, wherein the drawing step further comprises exerting an upward force on a bottom end of the glass pre-form arranged vertically.

11. A method of forming thin glass comprising:
obtaining a tubular glass pre-form having a tubular pre-form wall with an open end, a closed end, and a middle section between the open end and the closed end, the middle section of the glass pre-form including at least a first midsection and a second midsection adjacent to the first midsection, the open end of the glass pre-form opening into a cavity extending into the pre-form at least to the first midsection;
heating the first midsection of the glass pre-form by centripetally applying heat from a localized heat source to the first midsection of the glass pre-form;
blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;
blowing a gas against an exterior surface of the glass pre-foiin to limit expansion of the first midsection to a desire width; and
longitudinally drawing the heated first midsection of the glass pre-form, thereby thinning the pre-form wall in the first midsection; pulling the top end upward;
lowering the localized heat source toward the bottom end at a lowering rate that is slower than a pulling rate at which the top end is pulled upward; and
keeping the bottom end substantially vertically stationary.

12. A method of forming thin glass comprising:
obtaining a tubular glass pre-form having a tubular pre-form wall with an open end, a closed end, and a middle section between the open end and the closed end, the middle section of the glass pre-form including at least a first midsection and a second midsection adjacent to the first midsection, the open end of the glass pre-form opening into a cavity extending into the pre-form at least to the first midsection;
heating the first midsection of the glass pre-form by centripetally applying heat from a localized heat source to the first midsection of the glass pre-form;
blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;

blowing a gas against an exterior surface of the glass pre-form to limit expansion of the first midsection to a desire width;

longitudinally drawing the heated first midsection of the glass pre-form, thereby thinning the pre-form wall in the first midsection; pulling the bottom end downward;

keeping the top end substantially vertically stationary; and one of: (i) lowering the localized heat source toward the bottom end at a lowering rate that is faster than a pulling rate at which the bottom end is pulled downward, and (ii) raising the localized heat source toward the top end at a raising rate that is slower than the rate at which the bottom end is pulled downward.

13. A method of forming thin glass comprising:

obtaining a tubular glass pre-form having a tubular pre-form wall with an open end, a closed end, and a middle section between the open end and the closed end, the middle section of the glass pre-form including at least a first midsection and a second midsection adjacent to the first midsection, the open end of the glass pre-form opening into a cavity extending into the pre-form at least to the first midsection;

heating the first midsection of the glass pre-form by centripetally applying heat from a localized heat source to the first midsection of the glass pre-form;

blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;

blowing a gas against an exterior surface of the glass pre-form to limit expansion of the first midsection to a desire width;

longitudinally drawing the heated first midsection of the glass pre-form, thereby thinning the pre-form wall in the first midsection; pulling the bottom end downward;

lowering the top end at a lowering rate that is slower than a rate at which the bottom end is pulled downward; and maintaining the localized heat source at a substantially stationary vertical orientation.

14. A method of forming thin glass comprising:

obtaining a tubular glass pre-form having a tubular pre-form wall with an open end, a closed end, and a middle section between the open end and the closed end, the middle section of the glass pre-form including at least a first midsection and a second midsection adjacent to the first midsection, the open end of the glass pre-form opening into a cavity extending into the pre-form at least to the first midsection;

heating the first midsection of the glass pre-form by centripetally applying heat from a localized heat source to the first midsection of the glass pre-form;

blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;

blowing a gas against an exterior surface of the glass pre-form to limit expansion of the first midsection to a desire width;

longitudinally drawing the heated first midsection of the glass pre-form, thereby thinning the pre-four wall in the first midsection; pulling the top end upward;

lowering the localized heat source toward the bottom end at a rate that is faster than a pulling rate at which the top end is pulled upward; and keeping the bottom end substantially vertically stationary.

15. The system of claim 14, wherein the pre-form has a width of about 60 mm and a wall of the glass thickness of about 2 mm.

16. The system of claim 14, wherein pulling mechanism is operable to vertically pull on at least one of the two ends to draw at least one of the midsections.

17. A method of forming thin glass comprising:

obtaining a tubular glass pre-form having a tubular pre-form wall with an open end, a closed end, and a middle section between the open end and the closed end, the middle section of the glass pre-form including at least a first midsection and a second midsection adjacent to the first midsection, the open end of the glass pre-form opening into a cavity extending into the pre-form at least to the first midsection;

applying heat from a localized heat source centripetally to the first midsection of the tubular glass pre-form;

blowing a gas into the open end to expand the cavity at the heated first midsection and to blow the heated first midsection, thereby substantially laterally expanding a diameter of the cavity in the first midsection of the glass pre-form and thinning the pre-form wall in the first midsection;

blowing a gas against an exterior surface of the glass pre-form to limit expansion of the first midsection to a desire width;

longitudinally drawing the heated first midsection of the glass pre-form, thereby thinning the pre-form wall in the first midsection;

pulling the top end upward;

floating the bottom end;

raising the bottom end at a raising rate that is slower than a pulling rate at which the top end is pulled upward; and maintaining the localized heat source at a substantially stationary vertical orientation.

18. A system for processing a tubular glass pre-form having a tubular pre-form wall having an open end and a closed end arranged vertically, the open end opening into a cavity of the pre-form at least to a first midsection and a second adjacent midsection, all aligned in a longitudinal direction, the system comprising:

a localized heat source that centripetally locally heats at least one of the first and second midsections;

a gas supply that blows a gas into the open end to substantially expand the cavity in the one of the first and second midsections, thereby substantially increasing a width of the one of the first and second midsection of the pre-form and thinning the pre-form wall in the one of the first and second midsections;

a chuck that forms a gas connection between the open end and a gas source;

an air bearing that centripetally blows against an exterior surface of the one of the first and second midsection of the as the cavity section is being expanded;

a pulling mechanism that vertically pulls on at least one of the two ends to draw at least one of the midsections in the longitudinal direction, thereby thinning the one of the first and second midsections;

an advancing mechanism that advances the pre-form in the longitudinal direction relative to the localized heat source such that: (i) at least a portion of the first midsection of the perform is advanced longitudinally away from the localized heat source and the heat therefrom is no longer centripetally applied to such portion, and (ii) the second midsection of the perform is advanced longitudinally toward and into proximity with the localized heat source and the heat from the localized heat source is centripetally applied to the second midsection of the glass pre-form; and a suspension mechanism that attaches to and suspends the top end.

19. The system of claim 18, wherein the pulling mechanism further comprises a floatation mechanism operable to support the bottom section by floatation as the at least one midsection is drawn.

20. The system of claim 18, further comprising an in-line cooling device operable to centripetally cool the glass pre-form after the at least one midsection has been blown and drawn.

21. The system of claim 18, further comprising an in-line coating device operable to centripetally apply a polymer laminar coating to the glass pre-form after the at least one midsection has been blown and drawn.

22. The system of claim 18, further comprising an in-line cutting device operable to cut the glass pre-form after the at least one midsection has been blown and drawn.

23. The system of claim 22, wherein the in-line cutting device comprises a laser operable to helicoidally cut the middle section into a ribbon.

24. The system of claim 18, wherein the air bearing comprises a cylinder made of fine porosity graphite defining an annular cavity between the cylinder and the localized heat source, the annular cavity having an air intake for connection to a pressurized air source.

\* \* \* \* \*